United States Patent
Cobb et al.

(10) Patent No.: US 8,584,422 B2
(45) Date of Patent: Nov. 19, 2013

(54) EXTRUDED MOLDING SET

(75) Inventors: William M. Cobb, Jacksonville, FL (US); Jesus Gonzalez, Jacksonville, FL (US)

(73) Assignee: Coastal Industries, Inc., Jacksonville, FL (US)

( * ) Notice: Subject to any disclaimer, the term of this patent is extended or adjusted under 35 U.S.C. 154(b) by 0 days.

(21) Appl. No.: 13/136,450

(22) Filed: Aug. 2, 2011

(65) Prior Publication Data
US 2013/0034385 A1    Feb. 7, 2013

(51) Int. Cl.
*E04B 2/00* (2006.01)
*E04B 1/61* (2006.01)

(52) U.S. Cl.
CPC .................................... *E04B 1/6183* (2013.01)
USPC ........................................................ 52/582.2

(58) Field of Classification Search
USPC ................. 52/578, 581, 582.1, 582.2, 586.1, 52/309.4, 783.1
See application file for complete search history.

(56) References Cited

U.S. PATENT DOCUMENTS

| | | | | |
|---|---|---|---|---|
| 3,712,005 A | * | 1/1973 | Eschbach et al. | 52/210 |
| 4,370,828 A | | 2/1983 | Miro | |
| 5,678,383 A | * | 10/1997 | Danielewicz | 52/775 |
| 7,500,713 B2 | * | 3/2009 | Riley et al. | 296/191 |
| 7,856,771 B2 | * | 12/2010 | Guidos et al. | 52/204.62 |
| 2002/0101095 A1 | * | 8/2002 | Gosselin et al. | 296/181 |
| 2002/0108323 A1 | * | 8/2002 | Gruber | 52/177 |
| 2009/0272056 A1 | * | 11/2009 | Koupal | 52/309.4 |

* cited by examiner

*Primary Examiner* — William Gilbert
*Assistant Examiner* — Kyle Walraed-Sullivan
(74) *Attorney, Agent, or Firm* — Thomas C. Saitta

(57) ABSTRACT

A first extruded molding and a second extruded molding combined to form an extruded molding set, the moldings joined in a mechanical interlocking manner, the first extruding molding having a release flange and the second extruded molding having a recessed portion that together define a release channel, whereby the first and second molding may be disconnected by inserting a pry tool into the release channel to release the mechanical interlock.

5 Claims, 2 Drawing Sheets

EXTRUDED MOLDING SET

BACKGROUND OF THE INVENTION

This invention relates generally to the field of extruded moldings, typically composed of aluminum or other material of similar properties, and more particularly relates to extruded molding sets that are utilized for joining vertically oriented panels and doors, such as found for example in shower enclosures.

When joining panels, doors and the like in a side-by-side planar or angled manner, it is known to utilize elongated molding sets, usually produced by extrusion. The molding sets are paired extruded members that connect to each other longitudinally. One elongated extruded member is joined to a panel member and the other extruded member is joined to a second panel or a door. Each of the extruded members is provided with a connection base configured to receive and retain the panel or the door, usually in conjunction with mechanical fasteners. The free sides of the extruded members are configured to mate or interconnect with each other, preferably without the need for mechanical fasteners, bonding or like means, with the interconnection being longitudinally extensive. With the extruded members respectively joined to the panel and door, the panel and door are positioned adjacent to each other and the extruded members are interlocked to combine the two extruded members into a relatively rigid vertical supporting and connecting means for the panel and door.

An example of an extruded molding set as described above is shown in U.S. Pat. No. 7,856,771 to Guidos et al. The extruded molding set shown in this patent comprises a pair of extruded moldings that are provided with two interconnecting means, a pivoting engagement interconnection and a mechanical locking interconnection, whereby the two moldings are first mated at the engagement interconnection, then one molding is pivoted to connect the mechanical interlocking connection, thereby securing the moldings to each other. A problem with this and similar constructions is that once the moldings are interlocked there is no easy way to disconnect the moldings, which would be desirable for example in order to replace a panel or door, which are often composed of glass, or to remove a panel or door to provide a temporary large access opening, for example.

It is an object of this invention to provide an extruded molding set intended and adapted for use with panels or doors, the set being structured to mechanically interlock together without the necessity of additional mechanical fasteners, wherein the set comprises structure which allows the extruded molding set to be easily and readily disconnected if desired.

SUMMARY OF THE INVENTION

The invention is an extruded molding set adapted for use with panels, doors or similar members, referred to hereinafter generally and collectively as panels, whereby the panels can be connected to each other in a side-by-side planar or angled orientation, the molding set comprising a pair of elongated extruded moldings, each molding structured to receive and retain a panel, and the moldings configured so as to longitudinally mate in interlocking manner. The first extruded member comprises a panel connection base adapted to retain a first panel, a first front face, a first rear face, a pivot flange member disposed on the free end of the first front face, a tongue member extending interiorly from the first rear face, and a release flange member extending laterally. The second extruded member comprises a panel connection base to retain a second panel, a second front face, a second rear face, a pivot channel member adapted to receive the pivot flange member, a locking channel member to receive the tongue member, and a recessed portion. With this construction, with the extruded members connected to the panels, the pivot flange member of the first extruded member is mated with the pivot channel member of the second extruded member. The extruded members are then pivoted together such that the tongue member of the first extruded member mates with the locking channel member of the second extruded member, thereby interlocking the extruded member set. The combination of the release flange member of the first extruded member and the recessed portion of the second extruded member defines a release channel sufficiently sized to allow for insertion of a pry tool such that the tongue member of the first extruded member can be removed from the locking channel member of the second extruded member, thereby disconnecting the extruded member set.

Alternatively presented, the invention is an extruded molding set comprising a first extruded molding comprising a first panel connection base, a first front face extending from said first panel connection base, a first rear face extending from said first panel connection base, a pivot flange member disposed on said first front face, and a tongue member and a release flange member disposed on said first rear face; a second extruded member comprising a second panel connection base, a second front face extending from said second panel connection base, a second rear face extending from said second panel connection base, a pivot channel member disposed on said second front face, and an internal flange, a locking channel member and a recessed portion disposed on said second rear face; said pivot flange member received by said pivot channel member in a manner whereby said first and second extruded members are pivotable relative to each other; said tongue member received by said locking channel member in a manner whereby said first and second extruded members are mechanically interlocked together; the combination of said release flange and said recessed portion defining a release channel adapted to receive a pry tool therein, whereby said tongue member may be leveraged from said locking channel member to disconnect said first and second extruded members.

DETAILED DESCRIPTION OF THE INVENTION

With reference to the drawings, the invention will now be described in detail with regard for the best mode and the preferred embodiment(s). The drawings are provided as required for illustrative purposes and not intended to be limiting. The term "panel" as used herein shall be taken to refer to and include panels, doors or similar members, such as for example glass shower enclosure panels and doors.

Figure 1:
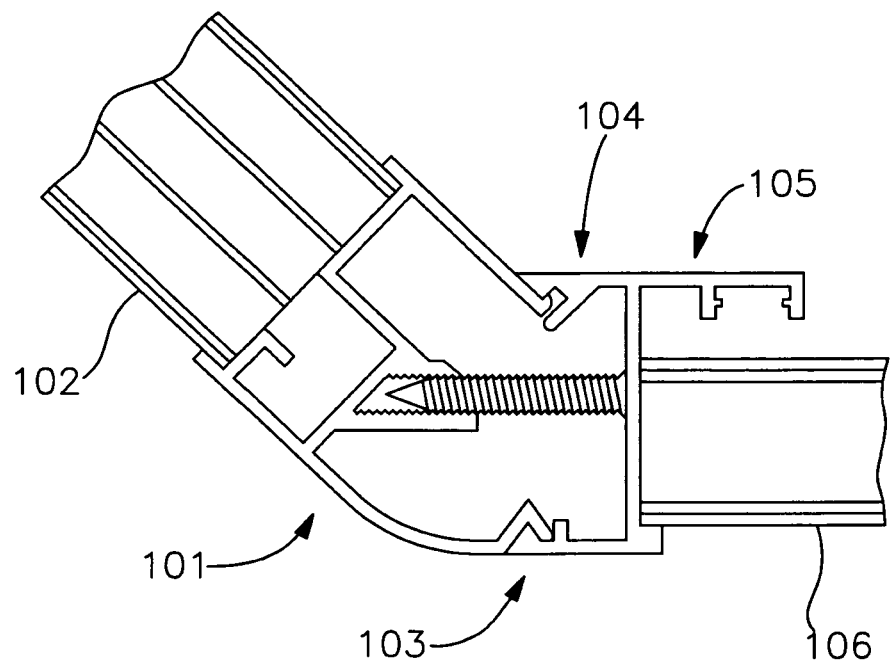
FIG. 1 is a cross-sectional view of a prior art extruded molding set.
Figure 2:
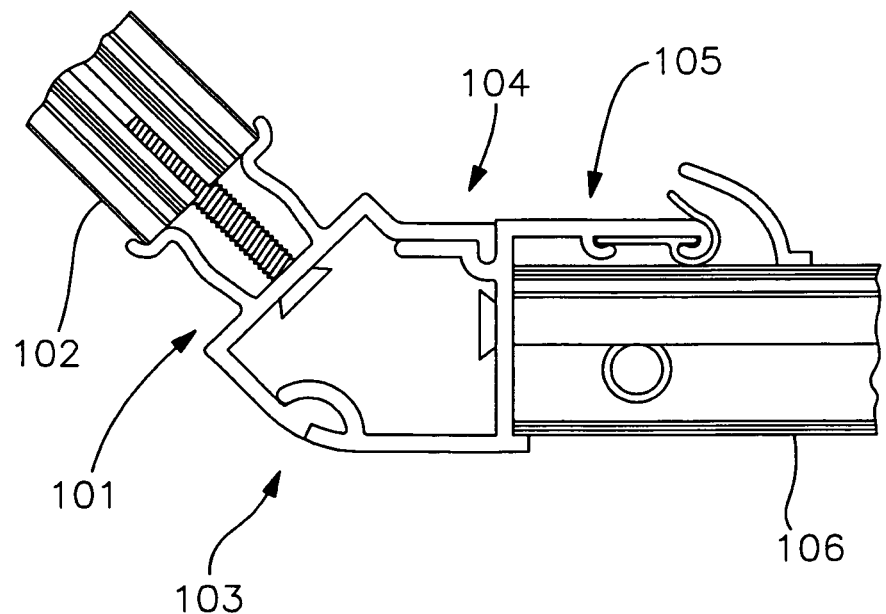
FIG. 2 is a cross-sectional view of another prior art extruded molding set.

FIGS. 1 and 2 illustrate prior art embodiments of extruded molding sets adapted for connecting panels to each other in a manner similar to the manner of this invention but without the release structure. Each of the extruded molding sets in the figures show a first extruded molding 101 connected to and retaining a first panel 102 and a second extruded molding 105 connected to and retaining a second panel 106. The two extruding moldings connect in interlocking manner through the combination of a pivoting engagement assembly 103 and a locking assembly 104. The extruded members 101 and 105 are joined together by first aligning or mating the pivoting engagement assembly 103. One of the extruded members 101 or 105 is then rotated such that the locking assembly 104 snaps together. Once interconnected, the extruded members 101 and 104 cannot easily be separated.

Figure 3:
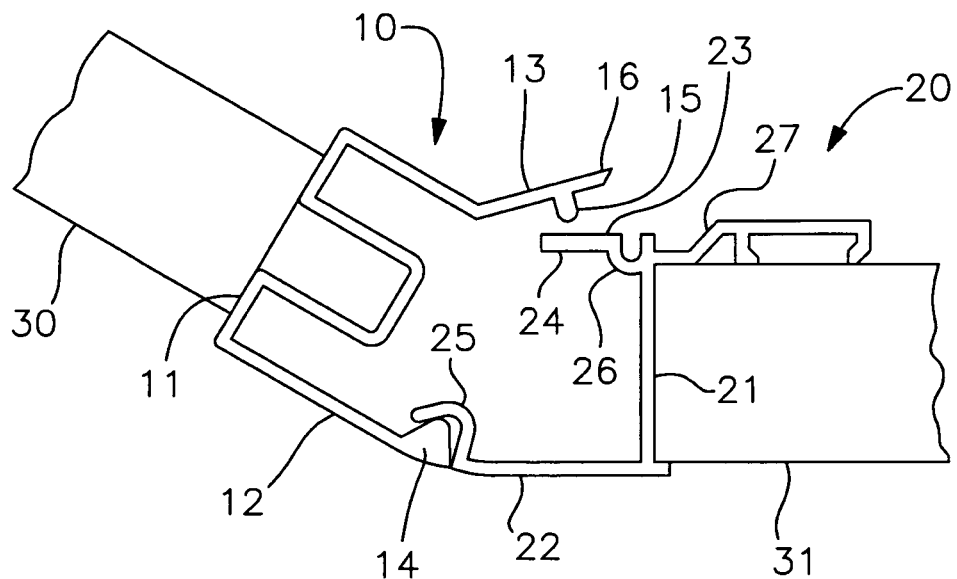
FIG. 3 is a cross-sectional view of an embodiment of the extruded molding set shown prior to interlocking.
Figure 4:
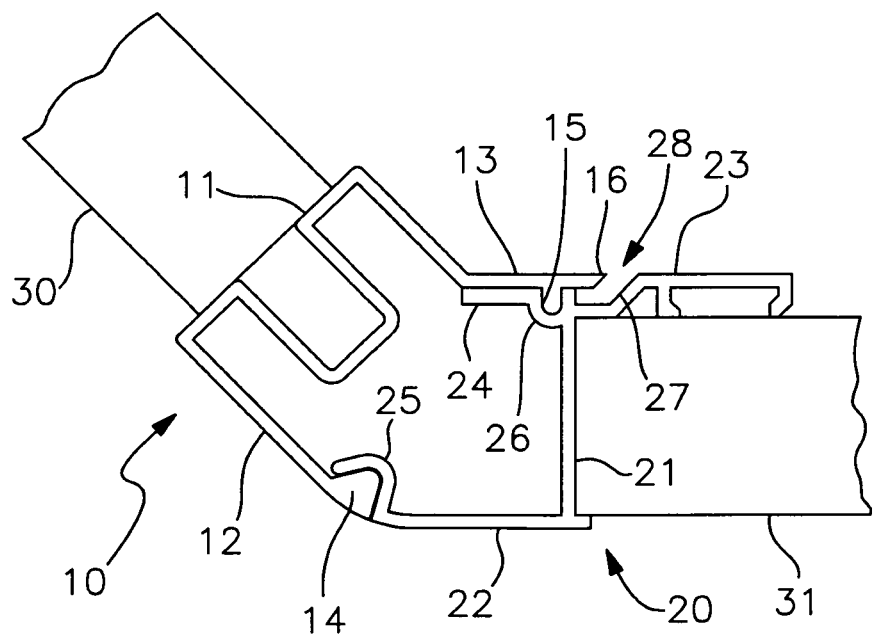
FIG. 4 is a cross-sectional view of the embodiment of FIG. 3 shown in the interlocked position.

A preferred embodiment of the extruded molding set of the invention is shown in FIGS. 3 and 4. The extruded molding set comprises a first extruded molding 10 and a second extruded molding 20. The moldings 10 and 20 are preferably composed of aluminum, but may be composed of any material possessing similar properties, such as other metals or rigid plastics. The moldings 10 and 20 are elongated members with the extended dimension defining a longitudinal direction. Each of the moldings 10 and 20 is adapted to receive and retain, or looked at another way, to be mountable onto the edge of a panel member 30/31. The moldings 10 and 20 may be joined to the panel edges in any known manner, such as for example by utilizing mechanical fasteners, mechanical interlocking or bonding compositions. As illustrated, first extruded molding 10 comprises a first panel connection base 11 suitable for connection to a fixed first panel 30, and second extruded molding 20 comprises a second panel connection base 21 suitable for connection for example to a pivoting second panel member 31, e.g., a door. The particular configurations of the panel connection bases 11 and 21 are not critical to the invention, and other known configurations, such as those panel connection bases shown in the illustrated prior art sets, may be substituted for the configurations in the illustrations without departing from the functionality of the invention. The sides of the moldings 10 and 20 opposite the panel connection bases 11 and 21 and extending away from panels 30 and 31 are configured as shown to be generally open.

The first extruded member 10 comprises a first front face 12 and a first rear face 13, both of which extend away from the first panel connection base 11. A longitudinally elongated pivot flange member 14 is disposed on the free edge of the first front face 12, i.e., the edge not connected to the first panel connection base 11. The pivot flange member 14 is preferably generally triangular or rounded in cross-section and extends toward the interior of the first extruded member 10. A longitudinally elongated tongue or rail member 15 is positioned on the interior of the first rear face 12 and extends inwardly. A longitudinally elongated release flange member 16 is disposed on the free edge of the first rear face 12 at the junction with and extending beyond the tongue member 15, the release flange 16 extending generally laterally.

The second extruded member 20 comprises a second front face 22 and a second rear face 23. A longitudinally elongated pivot channel member 25 is disposed on the free edge of the second front face 22, the pivot channel member 25 facing outwardly. The pivot channel member 25 is configured to receive and retain the pivot flange member 14 of the first extruded member 10 in a stable and relatively secure manner after the extruded members 10 and 20 are interconnected, in a manner which allows the extruded members 10 and 20 to be pivoted relative to each other during the interlocking operation. Thus, the mating sides of the pivot channel member 25 and the pivot flange member 14 will correspond or match, such that for a generally triangular pivot flange member 14 the receiving side of the pivot channel member 25 will be generally triangular, and for a generally curved pivot flange member 14 the receiving side of the pivot channel member 25 will be correspondingly curved. The second extruded member 20 further comprises a longitudinally elongated locking channel member 26 positioned on second rear face 23, the locking channel member 26 configured to receive and retain the tongue member 15 of the first extruded member 10. An internal flange 24 on the second rear face 23 extends generally laterally beyond the locking channel member 26 away from the second panel connection base 21. The second rear face 23 further comprises a recessed shoulder or portion 27 disposed on the opposite side of the locking channel member 26 from the internal flange member 24.

The extruded members 10 and 20 are interlocked by first aligning and mating the pivot flange member 14 and the pivot channel member 25, such that the pivot flange member 14 is positioned and received within the concave side of the pivot channel member 25. At this stage the extruded members 10 and 20 are oriented in a slightly open combination. As one or both of the extruded members 10 and 20 are pivoted together, the tongue member 15 of the first extruded member 10 encounters the internal flange 24 of the second extruded member 20, as seen in FIG. 3. Continued pivoting causes the first rear face 13 to be biased outwardly relative to the first panel connection base 11 such that when the tongue member 15 slides along the internal flange 24 and becomes aligned with the locking channel member 26, the tongue member 15 and first rear face 13 snap forward. The tongue member 15 is now received and retained by the locking channel member 26 and the internal flange 24 abuts the rear of the first rear face 13. With the tongue member 15 seated in the locking channel member 26, the pivot flange member 14 of the first extruded member 10 is fully seated within the pivot channel member 25, as shown in FIG. 4. The extruded members 10 and 20 and their attached panels 30 and 31 are now connected in a fixed manner.

In the interlocked position, the release flange member 16 of the first extruded member 10 extends past the locking channel member 26 so as to reside adjacent but separated from the recessed portion 27 of the second extruded member 20. The combination of the release flange member 16 and the recessed portion 27 define a longitudinally elongated release channel 28. With this structure, the extruded members 10 and 20 can be separated by inserted a pry member or tool, such as the flat blade of a screwdriver for example, into the release channel 28. The pry member is used to leverage the tongue member 15 out of the locking channel member 26 so that the extruded members 10 and 20 can then be pivoted apart and separated.

It is understood that equivalents and substitutions for certain elements set forth above may be obvious to those of ordinary skill in the art, and therefore the true scope and definition of the invention is to be as set forth in the following claims.

We claim:

1. An extruded molding set comprising:
a first extruded molding comprising a first panel connection base, a first front face extending from said first panel connection base, a first rear face extending from said first panel connection base, a pivot flange member disposed on said first front face, and a tongue member and a release flange member disposed on said first rear face;
a second extruded member comprising a second panel connection base, a second front face extending from said second panel connection base, a second rear face extending from said second panel connection base, a pivot channel member disposed on said second front face, and an internal flange abutting said first rear face of said first extruded molding, a recessed portion disposed on said second rear face, and a locking channel member disposed between said internal flange and said recessed portion;

said pivot flange member received by said pivot channel member in a manner whereby said first and second extruded members are pivotable relative to each other;

said tongue member received by said locking channel member in a manner whereby said first and second extruded members are mechanically interlocked together;

the combination of said release flange and said recessed portion defining a release channel receiving a pry tool therein, said recessed portion precluding contact between the pry tool and a panel retained by said second extruded member, whereby said tongue member may be leveraged from said locking channel member to disconnect said first and second extruded members.

2. The extruded molding set of claim 1, further comprising a first panel member connected to said first panel connection base and a second panel member connected to said second panel connection base.

3. An extruded molding set comprising:

a first extruded molding comprising a first panel connection base, a first front face extending from said first panel connection base, a first rear face extending from said first panel connection base, a pivot flange member disposed on said first front face, and a tongue member and a release flange member disposed on said first rear face;

a second extruded member comprising a second panel connection base, a second front face extending from said second panel connection base, a second rear face extending from said second panel connection base, a pivot channel member disposed on said second front face, and an internal flange abutting said first rear face of said first extruded molding, a recessed portion disposed on said second rear face, and a locking channel member disposed between said internal flange and said recessed portion;

said pivot flange member being mated with said pivot channel member; said tongue member being retained within said locking channel;

the combination of said release flange and said recessed portion defining a release channel receiving a pry tool therein, said release channel structured such that said recessed portion precludes contact between the pry tool and a panel retained by said second extruded member, whereby said tongue member may be leveraged from said locking channel member.

4. The extruded molding set of claim 3, further comprising a first panel member connected to said first panel connection base and a second panel member connected to said second panel connection base.

5. An extruded molding set comprising:

a first extruded molding comprising a first panel connection base, a first front face extending from said first panel connection base, a first rear face extending from said first panel connection base, a pivot flange member disposed on said first front face, and a tongue member extending inwardly from said first rear face and a release flange member extending laterally on said first rear face;

a second extruded member comprising a second panel connection base, a second front face extending from said second panel connection base, a second rear face extending from said second panel connection base, a pivot channel member disposed on said second front face, and an internal flange abutting said first rear face of said first extruded molding, a recessed portion disposed on said second rear face, and a locking channel member disposed on said second rear face between said internal flange and said recessed portion and adapted to receive said tongue member;

said pivot flange member mated with said pivot channel member in a manner whereby said first and second extruded members are pivotable relative to each other;

said tongue member mated with said locking channel member in a manner whereby said first and second extruded members are mechanically interlocked together;

a first panel member connected to said first panel connection base and a second panel member connected to said second panel connection base;

the combination of said release flange and said recessed portion defining a release channel receiving a pry tool therein, said release channel structured such that said recessed portion precludes contact between the pry tool and said second panel member, whereby said tongue member may be leveraged from said locking channel member to allow pivoting and disconnection of said first and second extruded members.

* * * * *